March 4, 1930.   A. P. WOOD   1,749,728
SPLIT FRAME FOR DYNAMO ELECTRIC MACHINES
AND METHOD OF MAKING THE SAME
Filed April 7, 1928
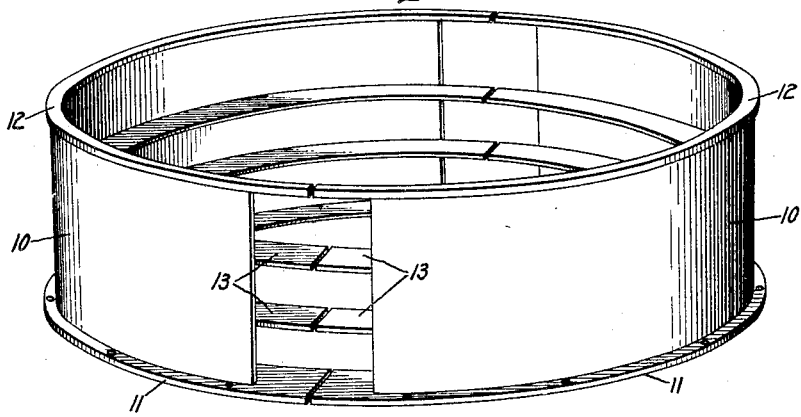
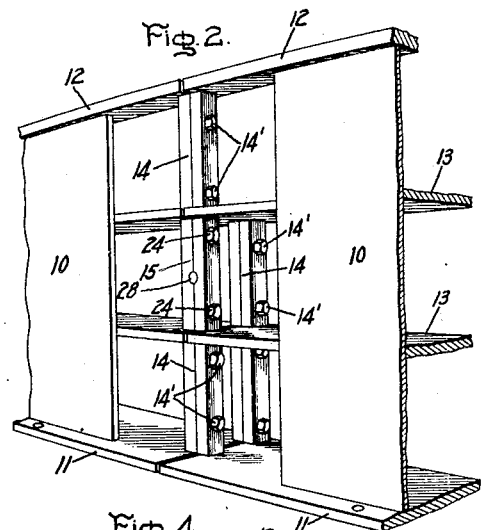
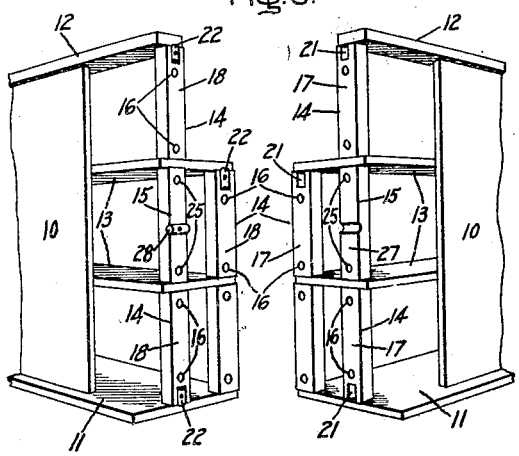
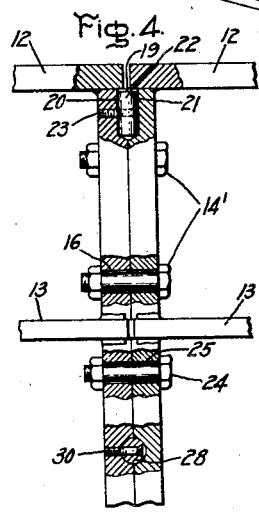
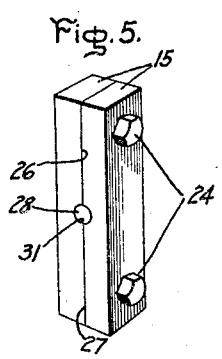
Inventor:
Alexander P. Wood,
by Charles E. Tulla
His Attorney.

Patented Mar. 4, 1930

1,749,728

UNITED STATES PATENT OFFICE

ALEXANDER P. WOOD, OF SCHENECTADY, NEW YORK, ASSIGNOR TO GENERAL ELECTRIC COMPANY, A CORPORATION OF NEW YORK

SPLIT FRAME FOR DYNAMO-ELECTRIC MACHINES AND METHOD OF MAKING THE SAME

Application filed April 7, 1928. Serial No. 268,336.

My invention relates to split frames for dynamo-electric machines, and a method of making the same.

In constructing dynamo-electric machines of large diameters it is often necessary, because of space limitations of available means of transportation, to split the stator frame in two or more sectors, which are taken apart when the machine is shipped, and which are reassembled when the machine is installed. Because of mechanical inaccuracy in building such machines, it is necessary that the frame sectors be reassembled in the same relation to each other they were before being taken apart for shipment and that the ends of the sectors be in a predetermined relation to each other. For this reason it has heretofore been the practice in constructing these frames to drill holes, when the sectors were assembled, at the joints thereof with their axes in alignment with the abutting surfaces of the sectors and then arrange dowel pins in these holes which engaged the opposing recesses formed in the abutting surfaces of the sectors by drilling the holes. In this way the dowel pins served to align the ends of the frame sectors so that they were necessarily reassembled with the ends thereof in proper relation to each other. Such a construction is difficult to make because of the inconvenience of drilling the holes at the abutting ends of the sectors when they are assembled and also because it involves handling the sectors and setting them up accurately in a machine of suitable size to finish the ends thereof. Moreover, making the joints in this manner often requires that the ends of the sectors be hand scraped after the machining operation to obtain an accurately fitting joint.

The object of my invention is to provide an improved split frame construction and to carry out a method of making the same, which will provide joints between the sectors insuring their being assembled in the same relation to each other when they are taken apart for shipment and reassembled during installation of the machine without the necessity of machining the ends of the sectors or drilling holes at the ends of the assembled frame sectors. I do this by making the frame in a plurality of sectors each having the ends thereof spaced apart from the ends of adjacent sectors and connecting the sectors together by means including pairs of separable members having means for retaining them in a predetermined relation to each other when they are secured together. In carrying out my improved method of making this construction I arrange the sectors of the frame in the relation to each other desired in the completed machine with the ends thereof spaced apart, arrange pairs of members separably secured together having aligning means retaining them in a predetermined relation to each other when they are secured together with one of the members of each pair adjacent the end of one of the frame sectors and the other of the members of each pair adjacent the end of an adjacent frame sector, and then attach the members in this relation to the ends of the frame sectors. By this method of construction of the stator frame all of the machine work required is done on the separable members, which greatly simplifies the construction of the stator frame as the separable members are small enough to be easily handled and the drilling or finishing operations can be done in machines of small size.

My invention will be more fully set forth in the following description referring to the accompanying drawing and the features of novelty which characterize my invention will be pointed out with particularity in the claims annexed to and forming a part of this specification.

In the drawing, Fig. 1 is a perspective view of a split stator frame being constructed by my improved method; Fig. 2 is a view of the completed joint between the sectors of the frame; Fig. 3 is a perspective view of the two abutting parts of the joint, shown in Fig. 2, separated; Fig. 4 is a side elevation of a portion of the joint shown in Fig. 2 partly broken away, and Fig. 5 is a perspective view of a pair of separable members employed in constructing a machine by my improved method.

Referring to the drawing, as illustrative of one manner of carrying out my invention, I have shown a fabricated frame for a vertical shaft generator which is made of a plurality of sectors for convenience in shipping. Each of these sectors comprises a curved plate 10 having arcuate reinforcing portions welded or otherwise attached thereto which are spaced apart axially of the frame. These arcuate portions include a base 11 welded to the lower edge of the plate 10, a rim 12 welded to the upper edge thereof, and webs 13 welded to the plate 10, which are spaced apart axially of the machine, and which are also spaced from the upper and lower edges of the plate 10. The inner periphery of the webs 13 and base 11 are in vertical alignment so as to form suitable supports for the lamination supporting ribs which are welded thereto in completing the frame.

These frame sectors are large and heavy so that it is difficult to machine the ends of the sectors to form a suitable joint which will insure the ends of the sectors being reassembled during installation of the machine in the same relation to each other that they were before being taken apart for shipment. In accordance with my invention this machining of the ends of the sectors is avoided by spacing the ends of the arcuate portions 11, 12 and 13 of each sector from the ends of the arcuate portions of adjacent sectors and connecting the ends of the arcuate portions together with separable members arranged in pairs 14 and 15 having means for retaining them in a predetermined relation to each other when they are secured together, which are comparatively small so that they can be easily handled and the drilling and finishing operations required in making them can be readily done in a machine of small size. The pairs of members 14 are secured together by bolts 14' which loosely fit holes 16 therein, and are machined on their abutting faces 17 and 18 so as to make an accurately fitting joint. In order to prevent the members 14 moving laterally relative to each other, when they are bolted together, holes 19 are drilled in the members with their axes in alignment with the abutting faces 17 and 18 to form opposing recesses 20 and 21 therein, and dowel pins 22 are arranged in these holes and secured to one of the members 14 by machine screws 23. The separable members 15 are secured together by bolts 24 which loosely fit holes 25 therein, and are also machined on their abutting faces 26 and 27 so as to make an accurately fitting joint. These members are prevented from moving longitudinally relative to each other by dowel pins 28, which are arranged in holes 31 drilled transversely of the members in alignment with the abutting faces thereof, and which are secured to one of the members by machine screws 30. As shown in Figs. 2 and 4, the pairs of members 14 and 15 are arranged axially of the stator between the spaced ends of the arcuate reinforcing portions 11, 12 and 13 of the sectors and welded thereto, one member of each pair being welded to the arcuate portions of one stator and the other member of each pair being welded to the ends of the arcuate portions of an adjacent sector. The spacing between the ends of the arcuate portions 11, 12 and 13 of each sector is quite small so that the ends of the separable members and the dowel pins 22 are substantially covered giving the joint a finished appearance. It is not necessary to accurately place the separable members in position at the ends of the frame sectors, or in any particular relation to each other, before welding them to the ends of the arcuate portions of the sectors, for the reason that the joint is formed between the abutting faces of the separable members. It will thus be seen that a machine made as above described can be much more easily constructed than in prior constructions which require accurate machining of the ends of the frame sectors. In this construction the dowel pins 22 insure the ends of the sectors being aligned radially of the frame and the dowel pins 28 insure the ends of the sectors being aligned axially of the frame, so that when the sectors are bolted together in installing the machine they will be retained in a predetermined relation to each other such as to form the proper air gap between the stator and the rotor.

In carrying out my improved method of making this frame, I arrange the sectors in the relation to each other desired in the completed machine, in any convenient manner, with the ends of the arcuate portions 11, 12 and 13 in spaced relation to each other. Then I arrange the pairs of members 14 and 15, which are bolted together with the dowel pins attached thereto, between the ends of the arcuate portions of the sectors with one member of each pair adjacent the end of one frame sector and the other member of each pair adjacent the end of an adjacent frame sector, as shown in Fig. 2; and then I weld or otherwise attach the members in this relation to the ends of the arcuate portions 11, 12 and 13.

It will thus be seen that I have provided an improved split frame construction and method of making the same which retains the ends of the sectors in a predetermined relation to each other when they are assembled without the necessity of machining the ends of the sectors or drilling dowel pin holes in the joints between the assembled sectors of the frame.

Various modifications of my invention will occur to those skilled in the art, so that I do not wish to be limited to the construction or process disclosed except as defined in the appended claims.

What I claim as new and desire to secure by Letters Patent of the United States, is:—

1. A split frame for dynamo-electric machines comprising a plurality of sectors having their ends spaced apart, and means forming a joint connecting said sectors including pairs of members separably secured together and having means for retaining them in a predetermined relation to each other when they are secured together.

2. A split frame for dynamo-electric machines comprising a plurality of sectors having their ends spaced apart, and means forming a joint connecting said sectors including pairs of members separably secured together and having means arranged between them for retaining them in a predetermined relation to each other when they are secured together.

3. A split frame for dynamo-electric machines comprising a plurality of sectors having their ends spaced apart, and means forming a joint connecting said sectors including pairs of members separably secured together and dowel pins arranged between them for retaining said members in a predetermined relation to each other when they are secured together.

4. A split frame for dynamo-electric machines comprising a plurality of sectors having their ends spaced apart, and means forming a joint connecting sectors including pairs of members bolted together and having dowel pins between them for retaining said members in a predetermined relation to each other when they are secured together.

5. A split frame for dyamo-electric machines comprising a plurality of sectors each having the ends thereof spaced apart from the ends of an adjacent sector, said sectors comprising arcuate portions spaced apart longitudinally of the axis of the frame, and pairs of members bolted together and attached to the ends of said arcuate portions, one member of each of said pairs being attached between the ends of the arcuate portions of one sector and the other member of each pair being attached between the ends of the arcuate portions of an adjacent sector so as to form separable joints between said sectors, and means for retaining said separable members in a predetermined relation to each other when they are bolted together.

6. A split frame for dynamo-electric machines comprising a plurality of sectors each having the ends thereof spaced apart from the ends of an adjacent sector, said sectors comprising arcuate portions spaced apart longitudinally at the axis of the frame, and pairs of members bolted together and attached to the ends of said arcuate portions, one member of each of said pairs being attached between the ends of the arcuate portions of one sector and the other member of each pair being attached between the ends of the arcuate portions of an adjacent sector, so as to form separable joints between said sectors, and means including dowel pins arranged between said separable members for retaining them in a predetermined relation to each other when they are bolted together.

7. A split frame for dynamo-electric machines comprising a plurality of sectors each having the ends thereof spaced apart from the ends of an adjacent sector, said sectors comprising arcuate portions spaced apart longitudinally at the axis of the frame, and pairs of members bolted together and attached to the ends of said arcuate portions, one member of each of said pairs being attached between the ends of the arcuate portions of one sector and the other member of each pair being attached between the ends of the arcuate portions of an adjacent sector, so as to form separable joints between said sectors, dowel pins arranged between said separable members for aligning the adjacent ends of said sectors relative to each other radially of said frame, and other dowel pins arranged between said separable members for aligning the adjacent ends of said sectors relative to each other axially of said frame.

8. The method of making a joint in a split frame of a dynamo-electric machine, comprising arranging the sectors of the frame in the relation to each other desired in the completed machine with the ends thereof spaced apart, arranging pairs of members separably secured together having aligning means retaining them in a predetermined relation to each other when they are secured together with one of the members of each pair adjacent the end of one of the frame sectors and the other of the members of each pair adjacent the end of an adjacent frame sector, and then attaching the members in this relation to the ends of the frame sectors so as to form a separable joint between the frame sectors adapted to align the ends thereof in a predetermined relation to each other when they are placed together.

9. The method of making a joint in a split frame of a dynamo-electric machine, comprising arranging the sectors of the frame in the relation to each other desired in the completed machine with the ends thereof spaced apart, arranging pairs of members separably secured together having aligning means retaining them in a predetermined relation to each other when they are secured together with one of the members of each pair adjacent the end of one of the frame sectors and the other of the members of each pair adjacent the end of an adjacent frame sector, and then welding the members in this relation to the ends of the frame sectors so as to form a separable joint between the frame sectors adapted to align the ends thereof in a predetermined relation to each other when they are placed together.

In witness whereof, I have hereunto set my hand this 6th day of April, 1928.

ALEXANDER P. WOOD.